B. H. SKELLY.
LUBRICATING SYSTEM.
APPLICATION FILED JUNE 8, 1920.
1,414,592.
Patented May 2, 1922.
2 SHEETS—SHEET 1.
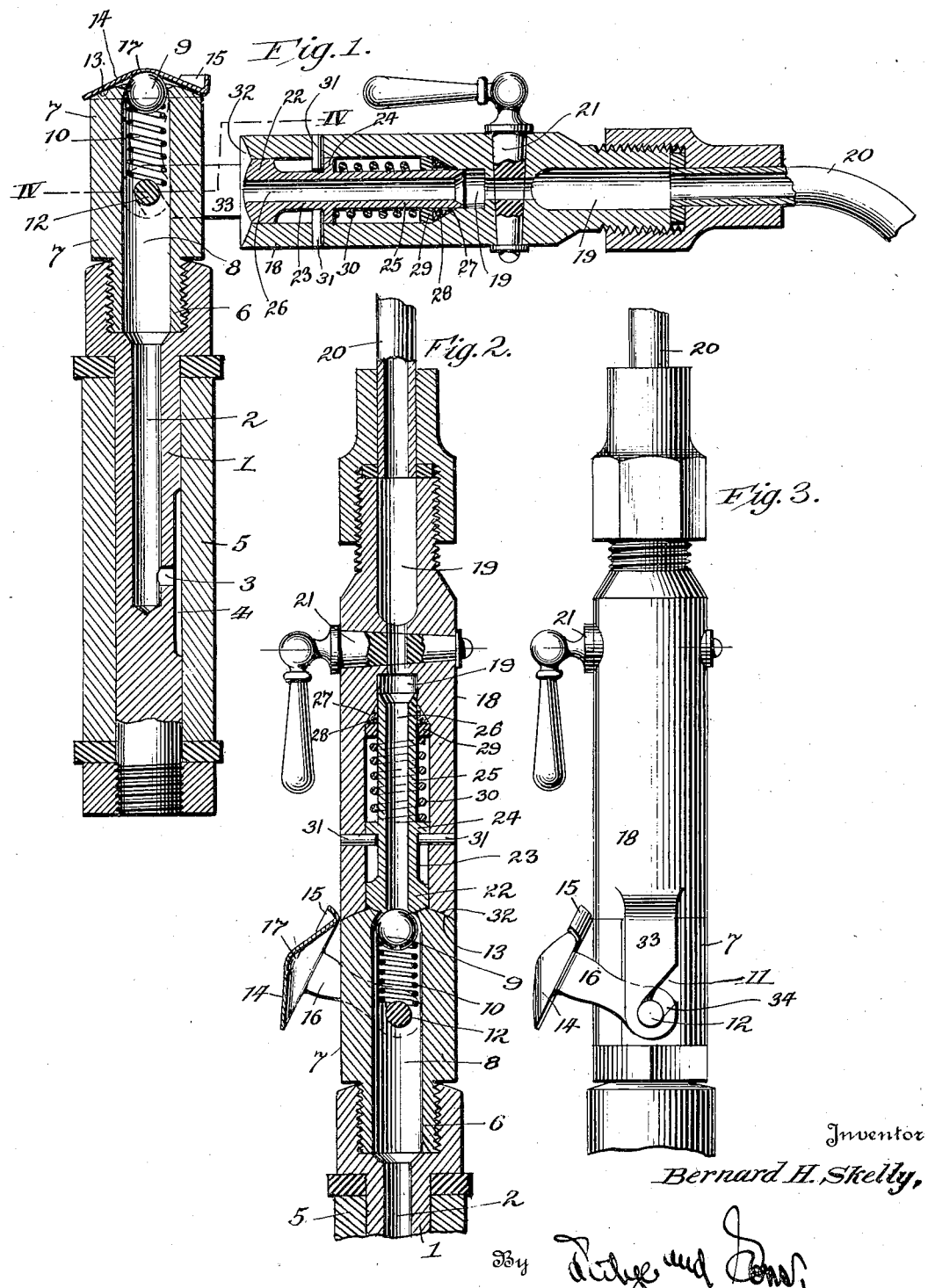
Inventor
Bernard H. Skelly,
By
Attorneys

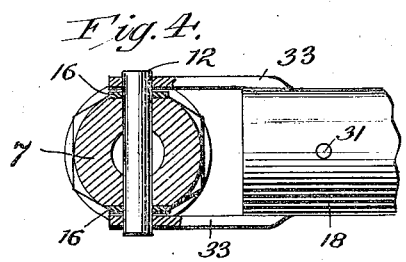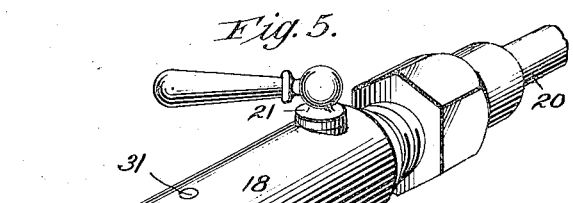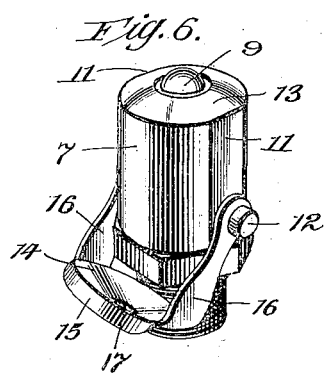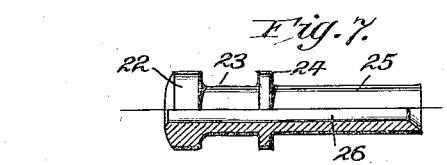

UNITED STATES PATENT OFFICE.

BERNARD H. SKELLY, OF BRIDGEPORT, CONNECTICUT.

LUBRICATING SYSTEM.

1,414,592. Specification of Letters Patent. Patented May 2, 1922.

Application filed June 8, 1920. Serial No. 387,322.

*To all whom it may concern:*

Be it known that I, BERNARD H. SKELLY, a citizen of the United States, residing at Bridgeport, in the county of Fairfield and State of Connecticut, have invented certain new and useful Improvements in Lubricating Systems, of which the following is a specification.

This invention pertains to an improved lubricating system, and has to do more particularly with the means employed for introducing lubricant to the various bearings of machinery, such for instance as the bearings of automobiles other than those which are generally connected up to the built in or permanent system of the car. In other words, the structure is applicable to shackle-bolt, spring-bolt, and other minor bearing lubrication of a motor car.

For the purpose of illustration the structure is shown in conjunction with a shackle-bolt, and, Fig. 1 shows a sectional view of such bolt having the lubricating cup or nipple secured thereto with the nozzle in that position that it is ready to be swung up into operative relation thereto;

Fig. 2 a similar view with the nozzle brought to functioning position;

Fig. 3 a side elevation of the parts in the same relative position as in Fig. 2.

Fig. 4 a detail sectional elevation on the line 4—4 of Fig. 1;

Fig. 5 a perspective view of the nozzle;

Fig. 6 a similar view of the nipple with the dust cap thrown to one side, and

Fig. 7 a sectional elevation of the locking plunger.

In said drawings 1 denotes a shackle or spring-bolt having a longitudinally disposed bore 2 formed therein from which opens a hole 3 leading to a groove 4 from which oil is supplied to the contacting surfaces of the bolt and the surrounding member 5.

The outer end of bolt 1 is interiorly threaded to receive the threaded stem 6 of a nipple like member 7. Said nipple is provided with a bore 8 the upper end of which is fashioned to form a seat for a ball valve 9 held to its seat by a light spring 10 arranged within the bore.

The nipple is flattened on opposite sides as at 11 and extending through the nipple and outwardly beyond such flattened sides is a pin 12, the ends whereof in effect form two studs, which have a dual function, the first of which is to provide pivots upon which the dust cap or closure is fulcrumed and, secondly, to provide an anchorage and pivot for the nozzle as will presently appear. The upper end 13 of the nipple is arc shaped or rounded the radius of curvature being coincident with the center of the pins 12. The dust cap may be said to comprise a hood like or head element 14 having an upstanding lip or flange 15 at one side thereof, the head having a curvature similar to that of the upper end 13 of the nipple and with which is adapted to make a close fit when it overlies the same.

Formed integrally with and extending inwardly from the head are two arms 16 said arms standing adjacent the flattened faces 11 and each having an opening formed therein through which the pin 12 extends. In other words, the dust cap is pivotally mounted upon the nipple with the ends of the pin 12 as its pivotal point. Head 14 is provided with an interior centrally disposed recess or depression 17 which, when the dust cap is brought to its closed position, forms a seat for the then outwardly protruding ball 9, see Fig. 1, and thus forms an impositive lock which serves to normally hold the cap in place.

The nozzle body is denoted by 18 and is provided with a longitudinally extending bore 19 which is in communication with a suitable pump, gun, or other power device (not shown) through a pipe or conduit 20 and from which the lubricant is supplied. A valve 21 is shown as controlling the supply to and through the nozzle but such is not essential so long as the lubricant forcing means is under control. Located in the outer portion of the nozzle is a locking plunger, comprising a rounded head 22, a reduced neck 23, a collar 24 and an elongated stem or cylindrical portion 25, the plunger having a bore or opening 26 extending longitudinally therethrough. The inner end of the stem like section 25 bears against the wall of the bore 19, said bore adjacent said end having an inclined face 27 between which and the stem 25 there is interposed a packing 28. The bore below or outward from this point to the outer end of the nozzle is enlarged in diameter.

A washer 29 underlies the packing 28 and is held up there-against by a coiled spring 30 which encircles the stem 25, the opposite end of the spring bearing against the collar 24. Said spring in addition to keeping the packing under pressure and thus preventing leakage of the lubricant around the stem, serves to force the plunger outwardly, such outward movement being limited by stop pins 31 projecting inwardly from the interior wall of the nozzle and underlying the collar 24.

The outer end of the nozzle is concave, as at 32, the curvature being the same as that of the rounded or curved face 13 of the nipple. The parts are so proportioned and arranged that the head 22 of the locking plunger extends outwardly from said curved face as best shown in Figs. 1 and 5.

Extending outwardly from and beyond the end of the nozzle are two fixed or rigid arms 33, said arms being shown as formed integral with the body of the nozzle though obviously they might be formed separately and secured to the nozzle. Each arm at its outer end is provided with an inclined slot 34 producing in effect hooks, the arms being spaced apart to such an extent that they will pass over or by the arms 16 of the dust cap and engage the ends of pin 12, see Fig. 4, the pin forming a fixed fulcrum about which the nozzle may be swung into its operative position.

With the parts as shown in Fig. 1 the dust cap is in its closed position and the valve 9 seated serving likewise to hold the cap in place. The operator is presumed to have hooked the arms 33 over the protruding ends of pin 12 whereupon the nozzle is swung upwardly into alinement with the nipple member, or into the position shown in Figs. 2 and 3.

As this takes place the lower end of the nozzle engages lip or flange 15 of the dust cap and forces the dust cap to swing laterally, the cap being carried clear of the upper end of the nipple upon the completion of the movement of the nozzle to place. As the nozzle begins to ride over the upper curved end 13 of the nipple, the protruding end or head 22 of the plunger contacts said end and is forced inwardly placing spring 30 under compression. When the nozzle comes into alinement with the nipple, the head 22 of the plunger contacts valve 9 and owing to the fact that spring 30 is of greater strength than spring 10, the plunger again moves outwardly forcing valve 9 from its seat and allowing the head 22 to enter the bore in the nipple. The spring 30 still continues to exert pressure on the plunger and as a consequence the parts will be locked in alinement. When the plunger is brought to its locking position valve 9 seats itself in the opening formed in the end of the plunger thus closing the bore or conduit therein but when lubricant under pressure is forced through the nozzle it readily forces the valve 9 inwardly permitting the lubricant to pass to the desired point.

When the requisite amount of lubricant has been forced to the element to be oiled or lubricated, the nozzle may be readily disconnected by swinging it back from the position shown in Figs. 2 and 3 to the position shown in Fig. 1, at which time, however, the dust cap 14 will stand to one side of the nipple 7. The nozzle may be disconnected from the pin 12 by simply lifting the hooks free of the pin, and the dust cap may be turned to its closed position where it will be held locked by the ball valve 9 which enters the central depression or recess 17 formed in the cap.

While the device is adapted more particularly for the forcing of oil to the part to be lubricated, it will be readily appreciated that it can be used with relatively heavy lubricant such as grease.

By reason of the fact that the dust cap 14 makes a relatively close fit with the upper end of the nipple or member 7, valve 9 might be omitted, the locking plunger of course at such time still functioning with the opening in the upper end of the nipple to lock the parts in place when the nozzle is swung into alinement with the nipple and the bore therein.

It is of course to be understood that where the element to be lubricated may be so fashioned that it takes in part the form of the nipple 7 as above described that such nipple as a separate element will not be necessary and the claims where they employ the terms ported member or nipple are to read with such understanding.

Having thus described my invention what I claim is:

1. In combination with a ported member; a dust cap arranged to cover the same; and a supply nozzle adapted to be moved into operative relation with said ported member and in the act of positioning to remove the dust cap.

2. In combination with a ported member having a curved outer end; a dust cap pivotally connected to said member and normally overlying said end; and a supply nozzle likewise having a pivotal connection with the member aforesaid, the outer end of the nozzle being curved to fit the curved end of the member, said nozzle contacting the dust cap and swinging the same free of the ported member as the nozzle is brought into operative relation to said last named element.

3. In combination with a ported element; a valve for closing the same; and a dust cap for said element, said cap being maintained in place by the valve.

4. In combination with a ported element; a dust cap pivotally connected to the element and adapted to be swung into position over the end of the same; and a valve serving to close the port and to maintain the dust cap in place.

5. In combination with a ported element; a spring pressed ball valve closing the outer end of the port; and a dust cap for covering said element and valve, said cap comprising a head and a pair of downwardly extending arms the latter being pivotally connected to the ported element.

6. In combination with a ported element, a spring pressed valve closing the outer end of the port and protruding slightly beyond the face of the element surrounding the port; and a dust cap pivotally connected to the ported element and adapted to overlie the valve and the contiguous face of the ported element, said cap having a depression formed therein for the reception of the ball valve whereby the cap will be held in place.

7. In combination with a ported member; a pair of studs extending outwardly from the sides thereof; a dust cap pivoted on said studs; a supply nozzle; a pair of arms extending from the nozzle, each of said arms having a hook at its outer end adapted to engage the studs; and a spring pressed hollow plunger mounted in the nozzle, the head of the plunger normally protruding beyond the end of the nozzle, and adapted, when the nozzle is swung into operative position with said ported member to enter the port and lock the nozzle in position.

8. In combination with a ported member; a pair of studs extending outwardly from the sides thereof, a dust cap adapted to overlie the end of said ported member, said cap having an upstanding flange at one side thereof; and a nozzle having a temporary swinging connection with the studs, whereby when the nozzle is swung to place it will engage the flange aforesaid and remove the cap from its covering position.

9. In combination with a ported member; a spring pressed valve closing the outer end of the port; a pair of studs extending outwardly from the sides of said ported member; a dust cap mounted for swinging movement on the studs, said cap having a depression formed therein into which the valve passes when the cap is in its covering position; a supply nozzle having a swinging connection with said studs; a hollow plunger mounted in said nozzle; and a spring for forcing the plunger in an outwardly direction, whereby when the nozzle is swung to operative position with relation to the ported element it will engage the cap and swing it laterally from its covering position and the plunger will contact the valve, forcing it from its seat and enter the port thus locking the nozzle in operative position.

10. In combination with a ported member having one end curved upon the arc of a circle and through which end the port opens; a pair of studs extending laterally from said member; a dust cap hinged upon said studs and having a contour to fit the curved face aforesaid; a supply nozzle having a curved outer end complemental in form to the curvature of the ported member; and a pair of hooked shaped arms extending from the nozzle adapted to engage the studs, said arms being of such length that when the arms are in engagement with the studs, and the nozzle is swung laterally, the end of the nozzle will first contact the dust cap and through continued movement, remove the dust cap from the ported member and finally come into operative relation with the ported member.

11. In combination with a ported member having one end curved upon the arc of a circle and through which end the port opens; a pair of studs extending laterally from said member; a dust cap hinged upon said studs and having a contour to fit the curved face aforesaid; a supply nozzle having a curved outer end complemental in form to the curvature of the ported member; a hollow spring actuated lock plunger mounted in the nozzle, the head of said plunger normally protruding beyond the curved face of the nozzle; and a pair of hooked shaped arms extending from the nozzle adapted to engage the studs, said arms being of such length that when the arms are in engagement with the studs, and the nozzle is swung laterally, the end of the nozzle will first contact the dust cap and, through continued movement, remove the dust cap from the ported member and finally come into operative relation with the ported member, with the head of the plunger in locking relation with the end of the port in the ported member.

12. In combination with a ported member having a convex outer end; a valve for closing the ported opening through said end; a supply nozzle having a quick attachable and detachable pivotal connection with the member aforesaid, the outer end of the nozzle being concave to fit the convex end of the ported member; and a spring pressed locking member carried by the nozzle and adapted to seat within the port in the first named member when the nozzle is brought to its operative position.

In testimony whereof I have signed my name to this specification.

BERNARD H. SKELLY.